US012450301B1

(12) United States Patent
Anumanchupallik et al.

(10) Patent No.: US 12,450,301 B1
(45) Date of Patent: Oct. 21, 2025

(54) TOPICS AND SUB-TOPICS FOR PRESENTING SEARCH RESULTS ON A DEVICE

(71) Applicant: Amazon Technologies, Inc., Seattle, WA (US)

(72) Inventors: Phani Teja Anumanchupallik, Berkeley, CA (US); Shaunak Mishra, Jersey City, NJ (US); Sarat Chandra Vadapalli, Sammamish, WA (US); Anirban Sengupta, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 111 days.

(21) Appl. No.: 18/082,632

(22) Filed: Dec. 16, 2022

(51) Int. Cl.
*G06F 16/20* (2019.01)
*G06F 16/2457* (2019.01)
*G06F 16/9538* (2019.01)

(52) U.S. Cl.
CPC .... *G06F 16/9538* (2019.01); *G06F 16/24578* (2019.01)

(58) Field of Classification Search
None
See application file for complete search history.

(56) References Cited

U.S. PATENT DOCUMENTS

| | | | | |
|---|---|---|---|---|
| 6,236,987 B1* | 5/2001 | Horowitz | ............... | G06F 16/951 |
| | | | | 707/999.005 |
| 11,561,987 B1* | 1/2023 | Sager | .................... | G06F 16/906 |
| 2015/0088668 A1* | 3/2015 | Bruce | ................... | G06F 16/972 |
| | | | | 705/14.73 |
| 2015/0262069 A1* | 9/2015 | Gabriel | ............... | G06F 16/9535 |
| | | | | 706/48 |
| 2020/0159795 A1* | 5/2020 | Weldemariam | ..... | G06F 16/9535 |
| 2021/0382944 A1* | 12/2021 | Li | ........................... | G06F 16/35 |
| 2023/0283582 A1* | 9/2023 | Bates | ..................... | G06F 18/22 |
| | | | | 709/206 |

OTHER PUBLICATIONS

Vedula, et al., "What matters for shoppers: Investigating key attributes for online product comparison," ECIR 2022.
Chen, et al., "Joint aspect extraction and sentiment analysis with directional graph convolutional networks," COLING 2020.
Bing, et al., "Unsupervised extraction of popular product attributes from e-commerce web sites by considering customer reviews," ACM TOIT 2016.

(Continued)

*Primary Examiner* — Belix M Ortiz Ditren
(74) *Attorney, Agent, or Firm* — Kilpatrick Townsend & Stockton LLP

(57) ABSTRACT

Techniques for providing information for presentation at a device are described. In an example, a computer system receives, from a device, a query indicating that item information is requested. The computer system determines a topic for the item information. The computer system determines a sub-topic of the topic, the sub-topic generated based at least in part on a semantic overlap between predefined item attribute refinements and user contributed entries related to the item. The computer system causes the device to present the item information, the topic, and the sub-topic in association with the topic.

17 Claims, 10 Drawing Sheets

(56) References Cited

OTHER PUBLICATIONS

Giannakopoulos, et al., "Unsupervised aspect term extraction with b-lstm & crf using automatically labelled datasets," webpage available at: https://aclanthology.org/W17-5224/, 2017.

He, et al., "An unsupervised neural attention model for aspect extraction," webpage found at: https://aclanthology.org/P17-1036/ ,2017.

Lewis, et al., "BART: Denoising Sequence-to-Sequence Pre-training for Natural Language Generation, Translation, and Comprehension," webpage found at: https://arxiv.org/abs/1910.13461 ,2020.

Devlin, et al., "BERT: Pre-training of Deep Bidirectional Transformers for Language Understanding," webpage found at: https://aclanthology.org/N19-1423/ ,2019.

Reimers, et al., "Sentence-BERT: Sentence Embeddings using Siamese BERT-Networks," webpage found at: https://arxiv.org/abs/1908.10084, 2019.

See, et al., "Get To The Point: Summarization with Pointer-Generator Networks," webpage found at: https://arxiv.org/abs/1704.04368, 2017.

* cited by examiner

FIG. 8

TOPICS AND SUB-TOPICS FOR PRESENTING SEARCH RESULTS ON A DEVICE

BACKGROUND

As more content has been published online, it has become increasingly challenging for users to easily find the content that they are looking for. For example, a user may input a search query online for a particular item, expecting relevant results to be returned. However, despite efforts to improve recommendation systems, on-line systems may return results that are over-inclusive or under-inclusive of what the user expects or desires. Therefore, there is a need for improving recommendation systems to provide more relevant content to users.

BRIEF DESCRIPTION OF THE DRAWINGS

Various embodiments in accordance with the present disclosure will be described with reference to the drawings, in which:

FIG. 8 illustrates an example user interface 800 for providing description to a user, according to at least one example.

DETAILED DESCRIPTION

Figure 1:
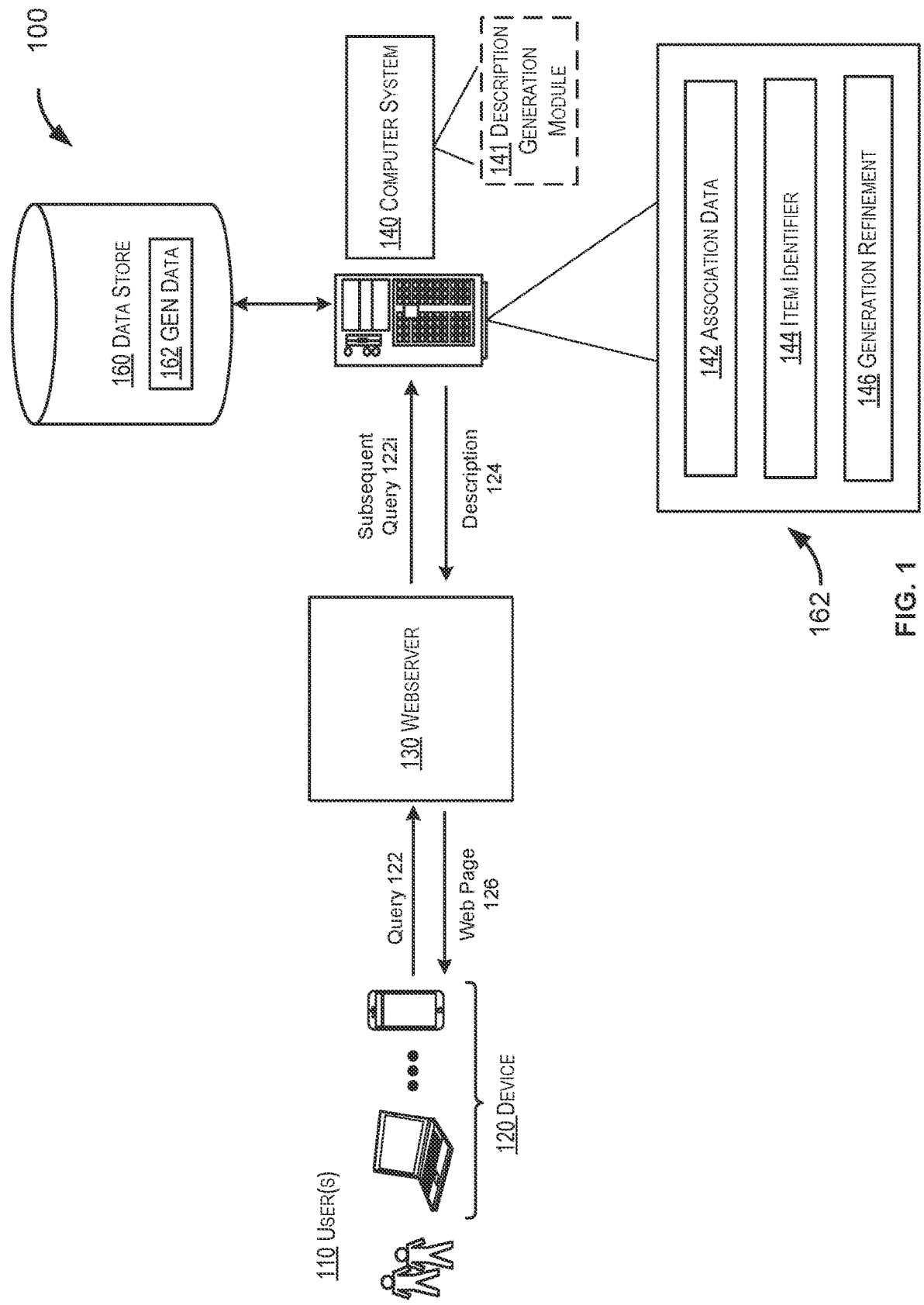
FIG. 1 illustrates an example of a network environment 100 for generating descriptions usable by a device to present information, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples of the present disclosure are directed to, among other things, generating sub-topics for items based on predetermined micro-themes and user contributed entries in, for example, an online item-searching context. To provide informative presentation of items to users, items can be presented with labels relating to their attributes. A label directed to an attribute that is broadly applicable across contexts and satisfies a general user intent can be referred as a "topic" or a "macro-theme". Moreover, a topic or a macro-theme may further contain at least one "sub-topic" or "micro-theme" to describe a more specific attribute and address users' expectations that are not sufficiently addressed by a topic or macro-theme. In an example, a computer system determines a set of predetermined micro-topics and a set of user contributed entries associated with a keyword. By determining a semantic overlap between the set of predetermined micro-topics and the set of user contributed entries, the computer system then determines a first set of micro-topics specifically relating to item attributes that users care about. The computer then forms a second set of micro-topics by removing micro-topics that are determined to be irrelevant. Based on the set of generation micro-topics, the computer system generates a third set of micro-topics for the keyword to further guide users via more specific item attributes. In response to a query containing the keyword, the computer system causes a device to present the third set of micro-topics.

A search thematic widget (TW) organizes items that share a unified theme. Such widgets appear with labels that make it easy for users to understand the theme and explain what the users will find. A unified theme may be a macro-theme or a micro-theme. In some examples, a macro-theme is applicable across contexts and satisfying a general shopping intent. An exemplary macro-theme may be a label of "Highly Rated" that is applicable across contexts and satisfying a general shopping intent (i.e., helping shoppers find products that are highly regarded by other shoppers). On the other hand, a micro-theme may be a subset theme within a macro-theme that presents more specific information according to a search query to address users' expectations that are not sufficiently addressed by a macro-theme.

To illustrate, consider a computer system that provides web pages via a web server. A user can use a device, such as a personal computing device and the like, to submit a query including a keyword and request a web page to show items associated with the keyword. For example, a user may submit a query including the keyword "headphones." The web server can present a plurality of headphones to the user, among which the headphones that are highly regarded by other shoppers can be presented under a macro-theme of "Highly Rated." Moreover, the web server can select and present the top three micro-themes that are determined by the methods described herein. Exemplary top three micro-themes can be "Sound Isolation," "For Exercising," and "Water Resistant." In some examples, the macro-theme and the micro-themes may be presented in the form of a title (for macro-theme) and subtitles (for micro-themes). For instance, the macro-theme can be presented as on top of a grid of headphones products. Below the macro-theme title, each cell of the grid presents a headphones product with the corresponding micro-theme.

Some or all of the process 400, 500, 600, or 700 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

FIG. 1 illustrates an example of a network environment 100 for generating descriptions usable by a device to present information, according to at least one example. As illustrated, the network environment 100 includes a device 120, a web server 130, and a computer system 140, though the network environment 100 can include any other suitable components (e.g., additionally or alternatively to those illustrated) for content insertion request processing. The device 120 is communicatively coupled to the web server 130, which is communicatively coupled to the computer system 140. In some examples, components that are communicatively coupled can communicate, such as by sharing data, etc., with one another via one or more networks such as a local area network, a wide area network (e.g., the Internet), or the like.

In some examples, the network environment 100 is configured to receive queries from one or more users 110 using one or more devices 120 over a web server 130 to a computer system 140. The one or more users 110 may each respectively operate a device 120. As used herein and for clarity of explanation, the one or more users 110 may interchangeably be referred to as a single user 110. Each device 120 may receive user input (e.g., a query including a keyword, an item selection, etc.), upon which the query including a keyword may be transmitted over the web server 130 to the computer system 140. The computer system 140 may operate at least one software module 141. In some examples, the at least one module 141 may be a description generation module that generates description of an item that is presented to the user 110. In some examples, the computer system 140 may receive input or query including a keyword from the user 110 and determine a set of candidate refinements associated with the input or query including the keyword. Then, based at least in part on the set of candidate refinements, the computer system 140 may determine to provide an item description for presentation to the user via the web server 130. To provide informative presentation of items to users, items can be presented together with display labels that describe their attributes. Depending on the particularity and specificity of the attribute being described, a display label may be referred as a topic or a sub-topic. A topic is a display label describing an attribute that is broadly applicable across contexts and satisfies a general user intent. An exemplary topic may be a "Highly Rated" label that helps shoppers find products that are highly regarded by other shoppers. Moreover, a topic can further contain more than one sub-topics that describe a more specific attribute and address users' expectations that are not sufficiently addressed by a topic. An exemplary topic may be a "Programmable" label displayed with a coffee maker to inform shoppers that the coffee maker is capable of making coffee according to user-defined preferences. Additionally, the topic "Highly Rated" and the sub-topic "Programmable" may be simultaneously displayed with a coffee maker that has high shopper rating and is programmable. In some examples, a topic may be referred to as a macro-theme and a sub-topic may be referred to as a micro-theme. As discussed herein, a "topic" and a "macro-theme" (as well as a "sub-topic" and a "micro-theme") may be used interchangeably. Additionally, as discussed herein, a topic or a sub-topic may also be generally referred to as a "description." In the interest of clarity of explanation, the embodiments herein below describe macro/micro-themes but are not limited as such and apply to any other types of topics/sub-topics.

The device 120 may correspond to any suitable electronic device that may be operated by a user 110 having remote communication capabilities to the web server 130. For example, a device 120 may be a personal computer (PC). A "mobile communication device" may be an example of a "device" that can be easily transported. Examples of remote communication capabilities include exchanging data between devices over short ranges (e.g., using a Bluetooth standard). Other examples of remote communication capabilities include using a mobile phone (wireless) network, wireless data network (e.g. 4G, 5G, or similar networks), Wi-Fi, Wi-Max, or any other communication medium that may provide access to a network such as the Internet or a private network. Examples of mobile communication devices include mobile phones (e.g. cellular phones), key fobs, PDAs, tablet computers, net books, laptop computers, personal music players, hand-held specialized readers, etc. Further examples of mobile communication devices include wearable devices, such as smart watches, fitness bands, ankle bracelets, rings, earrings, etc., as well as automobiles with remote communication capabilities.

A user 110 can provide input to the user device 120 that can generate a query 122 based on the input and transmit the query 122 to the web server 130. In some examples, the query 122 includes a web request to access a web page 126 or a request to display a plurality of items on the web page 126. In some examples, the web server 130 can insert potential content into the requested web page 126 and sends the web page 126 to the user device 120, which receives and displays the web page 126. In some examples, the web server 130 can associate the query 122 with contextual information relate to the user device 120 (e.g., a geographic location, an internet protocol (IP) address, a type of the user device, a type of the used web browser, etc.), the requested web page (e.g., its URL, the type of content it shows, web space for the additional content that can be inserted, etc.), the web server 130 itself, a network used to connect the device 120 and the like as needed. In some examples, the query 122 may also, but need not, indicate user identification, such as one or more cookies or logins are used.

In some examples, the query 122 may be received via one or more mechanisms. For example, the device 120 may receive a voice query from the user that contains one or more words. In another examples, the device may receive a click (or tap) on a graphical user interface (GUI) which indicates that the user selects an item on the screen (e.g., to add to a shopping cart.). In yet another example, the device 120 may receive multiple words via keyboard input as a search query. Any suitable input mechanism may be used to perform embodiments of the present disclosure.

The web server 130 includes a server cluster, server farm, other arrangements of servers or computing devices, or the like. In some examples, computing entities, such as social media platforms, etc., are used additionally or alternatively to the web server 130. In some examples, the web server 130 receives the query 122 and may further generate a subsequent query 122i based on the query 122. The subsequent query 122i can include the any information as needed. In addition, the subsequent query 122i may, but need not, indicate any potential content as needed. In some examples, when the query 122 includes a misspelling, the webserver 130 may correct the query 122 by eliminating the misspelling to generate the subsequent 122i.

The computer system 140 includes server cluster, server farm, other arrangements of servers or computing devices, or the like capable of determining descriptions of an item to be presented to a user 110 via the device 120. The computer system 140 can also include one or more software modules 141 in addition to the description generation module.

In some examples, the computer system 140 may be capable of storing generation data 162 in a data store 160 communicatively coupled to the computer system 140. In some examples, the data store 160 is included in the computer system 140. The data store 160 may include any data as needed.

The generation data 162 can include association data 142 that associates a keyword and a browse node of a web site, item identifier information 144, candidate refinement information 146 associated with the item identifier information 144, and the like. An item identifier may further include at least one sub-identifier. In some examples, each item identifier may be mapped to or associated with a plurality or a set of candidate refinements. A candidate refinement may be an attribute of an item or a product that is predetermined. In some examples, a candidate refinement may be a search refinement that is predetermined in the computer system 140 (e.g., a website, a sponsored product sourcing infrastructure, etc.) and can be retrieved by the computer system 140. Similar as macro-themes and micro-theme described, a candidate refinement may be a macro-thematic refinement or a micro-thematic refinement, depending on the particularity and specificity of the attribute that the refinement describes.

In some examples, after having received the query 122 including a keyword ("KW") from the device 120, the computer system 140 may retrieve the association data 142 that associates the keyword and a browse node of a web site. The computer system 140 then determines an item identifier 144 associated with the browse node and retrieves the generation refinements 146 of the item identifier 144. An item identifier may further include at least one sub-identifier. The generation refinements 146 may be retrieved from the data store 160. The generation refinements 146 may be macro-thematic or micro-thematic as discussed above. For example, when the computer system 140 receives a query 122 including a keyword as "coffee machine" from the user 110, the computer system 140 may retrieve various micro-thematic refinements such as "programmable" or "machine material." In some examples, the "machine material" micro-thematic refinement may further include another micro-thematic refinement of "metal." In some examples, the generation refinements 146 may be determined or further processed by using any machine learning model or a combination thereof.

Based at least in part on the generation refinements 146, the computer system 140 generates description 124 of an item that is to be inserted in the web page 126 in response to the query 122, and transmits the description 124 to the web server 130. The web server 130 then inserts this description 124 in the web page 126 and sends the web page 126 to the device 120, which receives and displays the web page 126.

Figure 2:
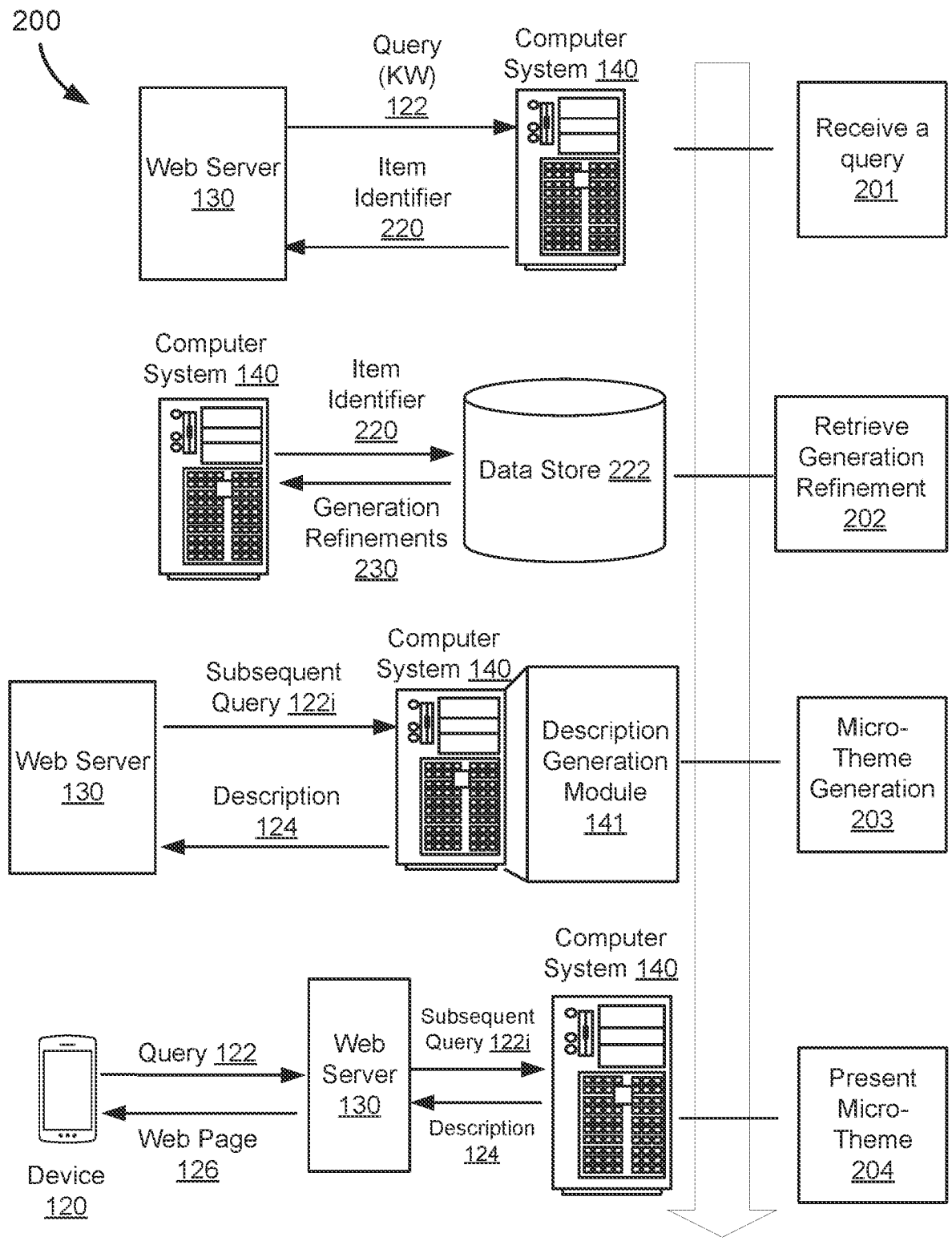
FIG. 2 illustrates an example architecture 200 of a computer system to support generating micro-themes that can be presented by a device, according to at least one example.

FIG. 2 illustrates an example architecture 200 of a computer system to support generating micro-themes that can be presented by a device, according to at least one example. As illustrated, the architecture includes the web server 130 and the computer system 140, though any other components can be included in the architecture 200 as needed. The web server 130 is communicatively coupled with the computer system 140. In some examples, the computer system 140 may further comprise components such as processor, system memory, external communication interface, and computer-readable medium operatively coupled to the processor. The computer system 140 may store a number of software modules. In some examples, the software modules may be similar to the at least one module 141 in FIG. 1. Exemplary software modules may include a communication module, a Questions and Answers (Q&A) aware refinements module, a description generation module, an ad sourcing module, a diversity module, and the like.

As illustrated by block 201, the web server 130 can receive a query (e.g., the query 122 described with respect to the network environment 100) from a device 120 to access a web page (i.e., web page 126 in FIG. 1). The query can include a keyword that may be associated to a browse node by using a mapping or relationship database (e.g., the association data 142 with respect to the network environment 100). The browse node may further be associated with an item identifier 220. An identifier may further include at least one sub-identifier. In some examples, the item identifier 220 may correspond to a unique identifier (e.g., a sequence of alphanumeric characters, numerical digits, or any suitable representation) that identifies an item. In some examples, the association between a keyword and the item identifier 220 may be stored using any suitable mechanism (e.g., a relational database). For example, using the illustration above, the computer system 140 may receive a query including a keyword of "coffee machine" and may, in turn, retrieve an item identifier 220 corresponding to the "coffee machine" keyword. In some examples, an additional module that specifically functions to associate or map query keywords to item identifiers may be included in the computer system 140.

As illustrated by block 202, with the item identifier 220, the computer system 140 can retrieve a set of generation refinements 230 that is associated with the item identifier 220 to generate the description (i.e., sub-topic/micro-theme) 124. In some examples, the computer system 140 may include a separate module to determine the set of generation refinements 230 that is associated with the item identifier 220.

To determine the set of generation refinements, the computer system 140 may first retrieve a plurality of candidate refinements (not shown in FIG. 2) that is predetermined and associated with the item identifier 220. As discussed above, depending on its particularity and specificity, a candidate refinement may be a macro-thematic refinement or a micro-thematic refinement. To form the set of generation refinements 230, the computer system 140 further retrieves a plurality or set of user contributed entries (e.g., questions being asked and answers by users about a product on a website) that is associated with the item identifier 220. The computer system 140 may determine the semantic overlap between the plurality of candidate refinements and the user contributed entries. In some examples, the semantic overlap is determined by using machine learning models. For example, the computer system 140 may use a Sentence-Bidirectional Encoder Representations from Transformers ("SBERT") model that generates embeddings for the set of candidate refinements and the set of user contributed entries, respectively. By comparing the cosine similarity between the generated embeddings, the SBERT model may infer the semantic overlap between the set of candidate refinements and the set of user contributed entries.

After having determined the semantic overlap between the set of candidate refinements and the set of user contributed entries, the computer system 140 may further determine a rank list of the candidate refinements based on their semantic overlap with the user contributed entries for that browse node. The rank list for a browse node may be determined according to various standards or thresholds as needed. In some examples, the rank list may only include candidate refinements that have a ranking position above a position number of N and any candidate refinements that fail to meet the standard will not be included in the list. In some examples, when the browse node has a hierarchical taxonomy, the computer system 140 may include the top 10 parent refinements (i.e., macro-thematic refinement) and the top 4 child refinement (i.e., micro-thematic refinement) for each of the selected parent nodes. The mapping between the rank list and the browse node may be stored using any suitable mechanism (e.g., the data store 222, a relational database, and the like).

To remove potential noise refinements from the rank list, the computer system 140 further includes a relevance classifier that gauges the relevance of a refinement for a given query 122. The relevance classifier may be any machine learning model as needed. In some examples, the relevance classifier is a Bidirectional Encoder Representations from Transformers ("BERT")-based classifier that is fine-tuned on annotated data (e.g., in the form of binary relevance labels for a query and refinement pair). The refinements in the rank list that are determined to be irrelevant to the query would be removed as noise, while the remaining refinements in the rank list may form a new set of generation refinements that will be used as input to generate the description 124 for the query 122.

As illustrated by block 203, the description generation module 141 of the computer system 140 generates description (i.e., sub-topic/micro-theme) 124 associated with the query 122 by using the set of generation refinements determined by block 203. The generated description 124 may be a string of fluent natural language text. In some examples, the generated description 124 may have a length that is less than 20 characters. In some examples, the description generation module 141 may use machine learning models to generate the description of the query 122. An exemplary machine learning model may be a fine-tuned Bayesian Additive Regression Trees ("BART") seq2seq model that includes a bi-directional encoder and an autoregressive decoder.

At block 204, the computer system 140 causes the device 120 to present a web page 126 that includes the description (i.e., sub-topic/micro-theme) 124 generated for the query 122. In some examples, before presenting the web page 126 to the device 120, the computer system 140 may additionally extract a child node text from the refinement path of the corresponding browse node. Moreover, the description generation module 141 can include a separate output classifier that estimates the informativeness of a child node in the browse node refinement path, and switches between outputting the generated description 124 or the directly copied child node text in the browse node refinement path. The output classifier may be a machine learning model that is trained to determine the probability of directly copying the child node text in the browse node refinement path as the sole component of the description. The output classifier may be trained based on the same data used for the training of the description generation machine model (i.e., the BART seq2seq model) at block 203. In some examples, the output classifier may use an output threshold and only outputs the copied child node text if the probability, or any value of interest, is higher than a predetermined threshold. In some examples, once the output classifier determines the output to be presented to the device 120, the computer system 140 transmits the determined output to the web server 130. The web server 130 may present the output via a web page 126 to the device 120.

Figure 3:
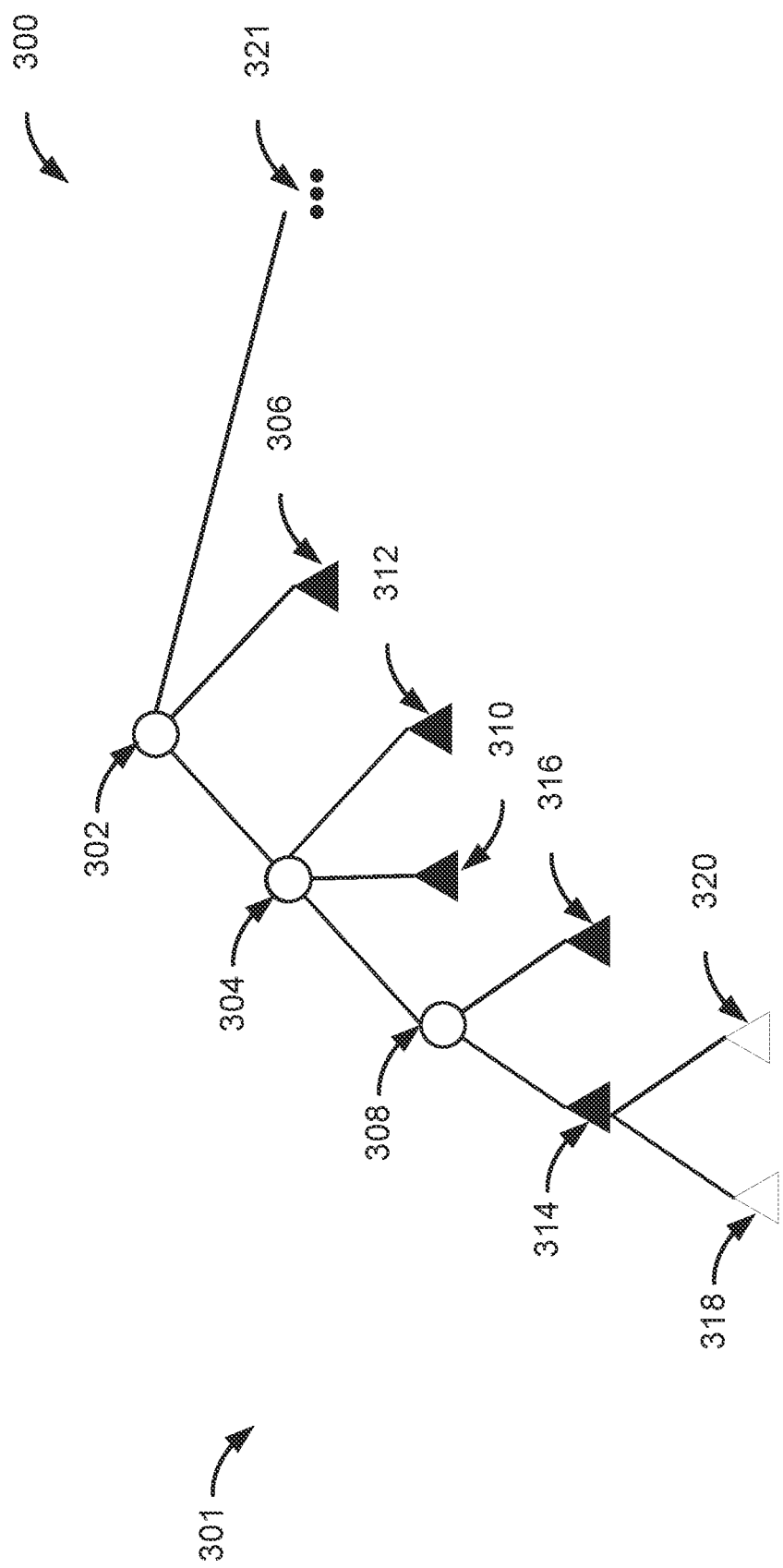
FIG. 3 illustrates an example tree of a browse node, according to at least one example.

FIG. 3 illustrates an example tree of a browse node, according to at least one example. As illustrated by FIG. 3, each node may correspond to an attribute of an item, and a given attribute may contain other sub-attribute as branches. For example, some nodes 302, 304, 308 (represented as circle nodes) may correspond to product assortments that are collections of different types of items (e.g., entertainment devices, home furnishings etc.), and these nodes may also be referred as "parent nodes." Other nodes 306, 310, 312, 314, 316, 318, 320 (represented as triangle nodes and may be referred as "child nodes"), respectively, may correspond to product categories that represent items of the same type (e.g., a product category), but whereby there may be different sub-types that are distinguished by having different attributes for each sub-type (e.g. televisions, LCD televisions, OLED televisions etc.). Thus, while a triangle node (e.g., 314) may further have additional child nodes 318 and 320, these additional child nodes may respectively represent items that have different attributes per node.

As a non-limiting example, the nodes of the example tree 300 may respectively correspond to "browse nodes" that may be predefined for a web site. In this example, each of the browse nodes may have one or more properties (e.g., attributes) that are associated with one or more items of the item catalog. Based at least in part on the attributes of each browse node, the description generation module 141 in FIGS. 1 and 2 may determine which nodes should be classified as the description text for a browse node or an item.

Within an e-commerce context using browse nodes (referenced above), in some examples, each of the browse nodes may have an attribute that defines whether the node is a "Product Assortment" node (e.g., representing an assortment of different product categories) or a "Product Category" node (e.g., representing a particular product category and/or product category sub-type). Using the illustration of FIG. 3, as described above, the circle nodes 302, 304 and 308 may correspond to Product Assortment nodes, while the triangle nodes 306, 310, 312, 316, 318, and 320 may correspond to Product Category nodes. For example, the description generation module 141 may determine that the text of node 318 should be used as the description to be presented to the user 110 by using a machine learning model. It should be understood that any suitable number of nodes 321 may be included within the example tree of nodes 300.

Figure 4:
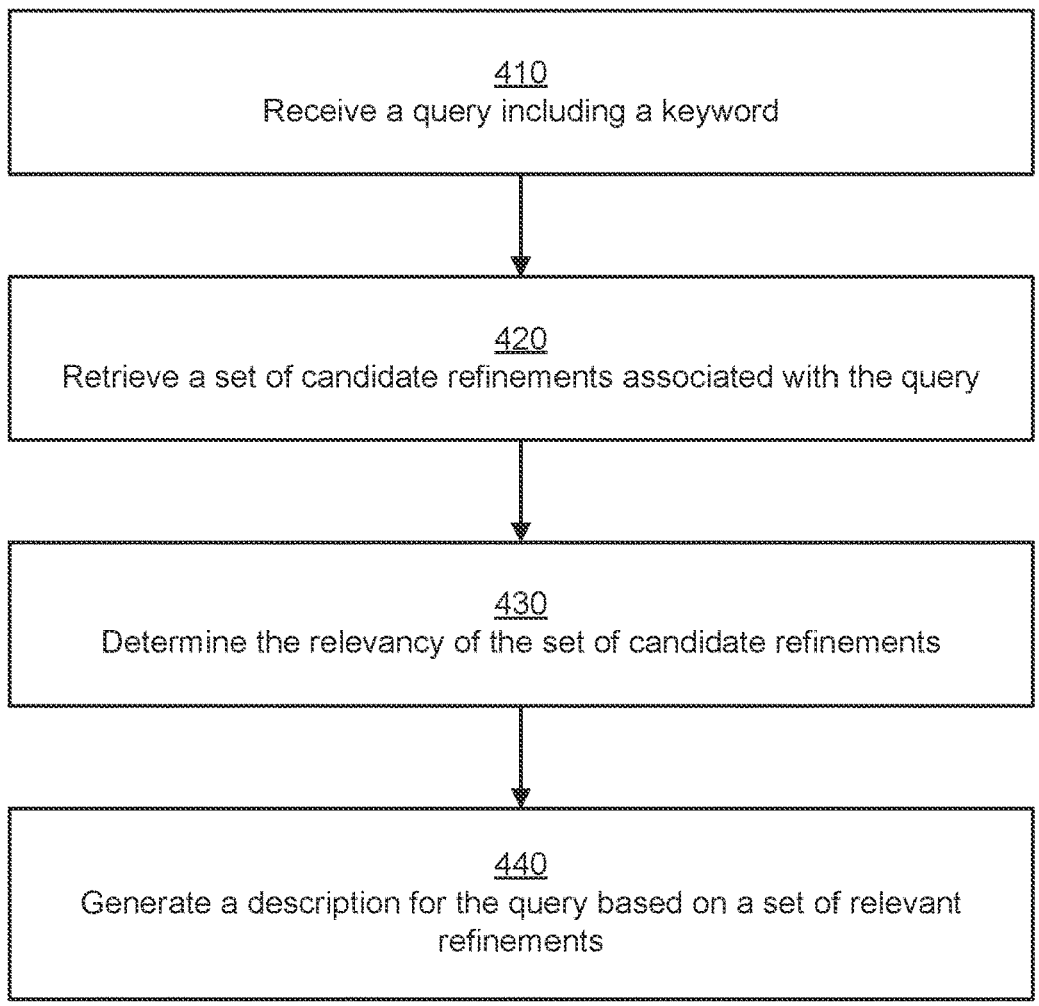
FIG. 4 illustrates an example flow of a process 400 for determining generation refinements for generating descriptions, according to at least one example.

FIG. 4 illustrates an example flow of a process 400 for determining generation refinements for generating descriptions, according to at least one example. Some or all of the processes (or any other processes described herein, or variations, and/or combinations thereof) may be performed under the control of one or more computer systems, such as the computer system 140 in FIG. 1, configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In an example, the flow includes operation 410, where the computer system 140 receives a query including a keyword from a device (i.e., the device 120 in FIG. 1). The query is not limited to any specific form or mechanism. For example, the query may be a voice query from the user that contains one or more words. In some examples, the device 120 in FIG. 1 may receive a query as a click (or tap) on a graphical user interface ("GUI") which indicates that the user selects an item on the screen (e.g., to add to a shopping cart.). In another example, the device 120 in FIG. 1 may receive multiple words via keyboard input as a search query. Any suitable input mechanism may be used to perform embodiments of the present disclosure.

In an example, the flow includes operation 420, where the computer system 140 retrieves a set of candidate refinements associated with the received query. Depending on its particularity and specificity of the attribute, a candidate refinement may be a macro-thematic refinement or a micro-thematic refinement. Taking e-commerce context such as Amazon.com as an example, an exemplary macro-thematic refinement may be "Highly Rated" and an exemplary micro-refinement may be a product attribute such as "Programmable" or "Machine Material" for a coffee machine. As further discussed with respect to FIG. 5, the retrieved set of candidate refinements associated with the query may be subject to further processes or steps that improve the quality of description generated for the query. Exemplary processes may be any processing that enables the computer system 140 to present more effective information in response to a query. In a non-limiting examples, the computer system 140 determines the semantic overlap between the set of candidate refinements and a set of user contributed content, form a rank list of candidate refinements that only includes candidate refinements before a ranking position of N, and the like. In some examples, the machine learning models may be unsupervised. In another examples, the machine learning models may be based on SBERT similarity that uses the cosine similarity between the embedding of the set of candidate refinements and the user contributed content for inferring the semantic overlap.

In an example, the flow includes operation 430, where the computer system 140 determines the relevancy of each candidate refinement in the rank list to filter out noise refinements. In some examples, the computer system 140 may use machine learning models or classifiers to determine the relevancy of each candidate refinement in the rank list. In some examples, the machine learning model may be supervised. In another examples, the classifier may be a BERT based classifier that is fine-tuned on annotated data (in the form of binary relevance labels for a query and refinement pair). After noise refinements were removed from the rank list, the operation 730 forms a set of generation refinements for description generation.

In an example, the flow includes operation 440, where the computer system 140 generates description (i.e., sub-topic/micro-theme) associated with the query to be presented based on the set of generation refinements. In some examples, the computer system 140 uses a separate module (e.g., the description generation module 141 in FIG. 1) to generate descriptions. In some examples, the computer system 140 uses a machine learning model to generate the description based on the set of generation refinements determined by operation 430. For example, the computer system 140 may use a fine-tuned BART seq2seq model that comprises a bi-directional encoder and an autoregressive decoder to generate a description based on the set of generation refinements of a query.

Figure 5:
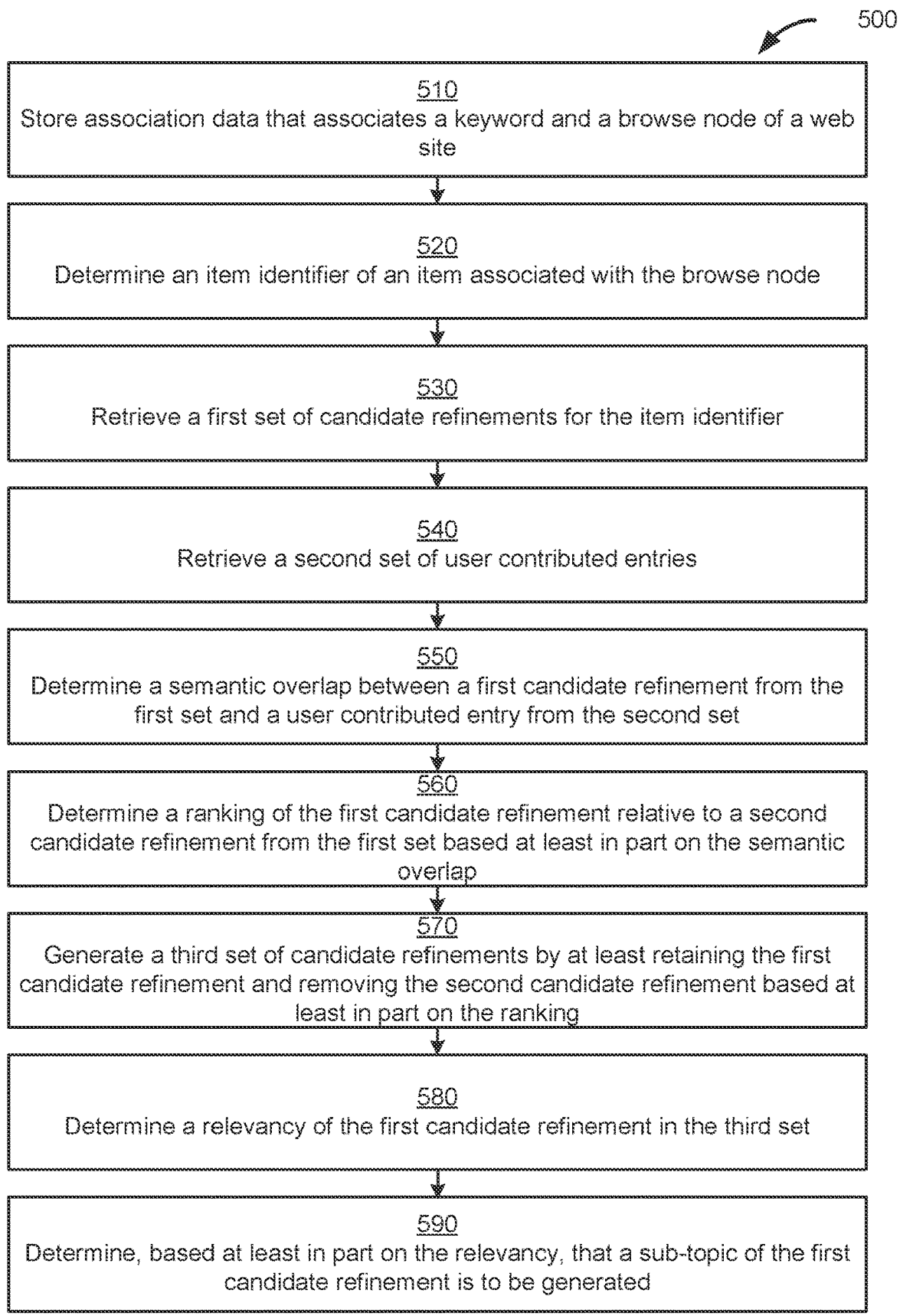
FIG. 5 illustrates an example flow of a process 500 for generating descriptions based on a set of generation refinements, according to at least one example.

FIG. 5 illustrates an example flow of a process 500 for generating descriptions based on a set of generation refinements, according to at least one example. Some or all of the processes (or any other processes described herein, or variations, and/or combinations thereof) may be performed under the control of one or more computer systems, such as the computer system 140 in FIG. 1, configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In an example, the flow includes operation 510, where the computer system 140 stores association data 142 that associates a keyword and a browse node of a website. In some examples, the association data 142 may be stored at a data repository such as the data store 160 in FIG. 1.

In an example, the flow includes operation 520, where the computer system 140 determines an item identifier of an item associated with the browse node. In some examples, the item identifier (e.g. 220 in FIG. 2) may correspond to a unique identifier (e.g., a sequence of alphanumeric characters, numerical digits, or any suitable representation) that identifies an item. An identifier may further include at least one sub-identifier. In some examples, the association between a keyword and an item identifier may be stored in the computer system 140 using any suitable mechanism (e.g., a relational database, the data store 160 in FIG. 1.). In some example, a separate module that specifically functions to associate or map query keywords to item identifiers may be included in the computer system 140.

In an example, the flow includes operation 530, where the computer system 140 retrieves a first set of candidate refinements for the item identifier determined by operation 520. Each refinement may be directed to an attribute of the item. Each refinement may further includes sub-refinements that are directed to sub-attributes of the item. Depending on its particularity and specificity, a candidate refinement may be a macro-thematic refinement or a micro-thematic refinement.

In an example, the flow includes operation 540, where the computer system 140 retrieves a second set of user contributed entries associated with the item identifier. In some examples, a user contributed entry might be the questions asked by shoppers related to a product.

In an example, the flow includes operation 550, where the computer system 140 determines a semantic overlap between a first candidate refinement from the first set and a user contributed entry from the second set. In some examples, the semantic overlap may be determined by using machine learning models as described with respect to FIG. 2.

In an example, the flow includes operation 560, where the computer system 140 determines a ranking of the first candidate refinement relative to a second candidate refinement from the first set based at least in part on the semantic overlap. The ranking of the candidate refinements may be subject to various standards as needed. Moreover, ranking is merely an exemplary processing that may be applied on the candidate refinements. A person skilled in the field should comprehend that any processing methods or logics may be used as desired.

In an example, the flow includes operation 570, where the computer system 140 generates a third set of candidate refinements by at least retaining the first candidate refinement and removing the second candidate refinement based at least in part on the ranking.

In an example, the flow includes operation 580, where the computer system 140 determines a relevancy of the first candidate refinement in the third set. In some examples, the computer system 140 uses machine learning models to determine the relevance for the first candidate refinement as described with respect to FIG. 2. A person skilled in the field should comprehend that determining relevancy is merely an example of noise removal factor, and any methods, logics, or factors may be used by operation 580 to improve the accuracy or informativeness of the description 124.

In an example, the flow includes operation 590, where the computer system 140 determines, based at least in part on the relevancy, that a sub-topic of the first candidate refinement is to be generated.

Figure 6:
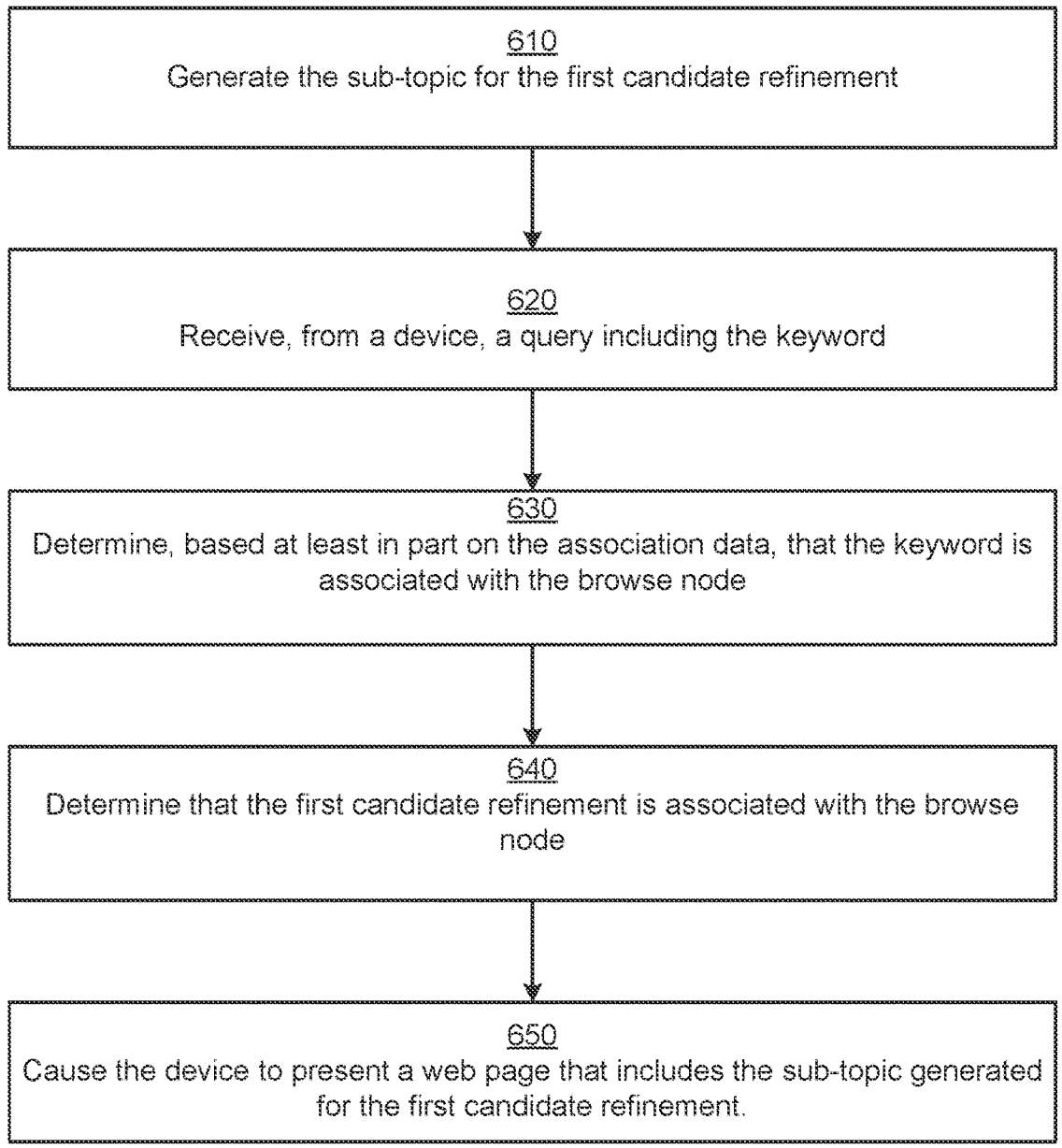
FIG. 6 illustrates an example flow of a process 600 for generating sub-topics based on the third set of candidate refinements determined in FIG. 5, according to at least one example.

FIG. 6 illustrates an example flow of a process 600 for generating sub-topics based on the third set of candidate refinements determined in FIG. 5, according to at least one example.

In an example, the flow includes operation 610, where the computer system 140 generates the sub-topic for the first candidate refinement from the third set of generation refinements determined in FIG. 5. In some examples, the computer system 140 uses machine learning models to generate the sub-topic. An exemplary machine learning model may be a fine-tuned BART seq2seq model that includes a bi-directional encoder and an autoregressive decoder.

In an example, the flow includes operation 620, where the computer system 140 receives, from a device, a query including the keyword. The query is not limited to any specific form or mechanism. For example, the query may be a voice query from the user that contains one or more words. In some examples, the device 120 in FIG. 1 may receive a query as a click (or tap) on a GUI which indicates that the user selects an item on the screen (e.g., to add to a shopping cart.). In another example, the query may be a user input that contains multiple words via keyboard. Any suitable input mechanism may be used to perform embodiments of the present disclosure.

In an example, the flow includes operation 630, where the computer system 140 determines, based at least in part on the association data, that the keyword is associated with the browse node. In some examples, the determination data may be stored at the data store 160.

In an example, the flow includes operation 640, where the computer system 140 determines that the first candidate refinement is associated with the browse node.

In an example, the flow includes operation 650, where the computer system 140 causes the device to present a web page that includes the sub-topic generated for the first candidate refinement.

Figure 7:
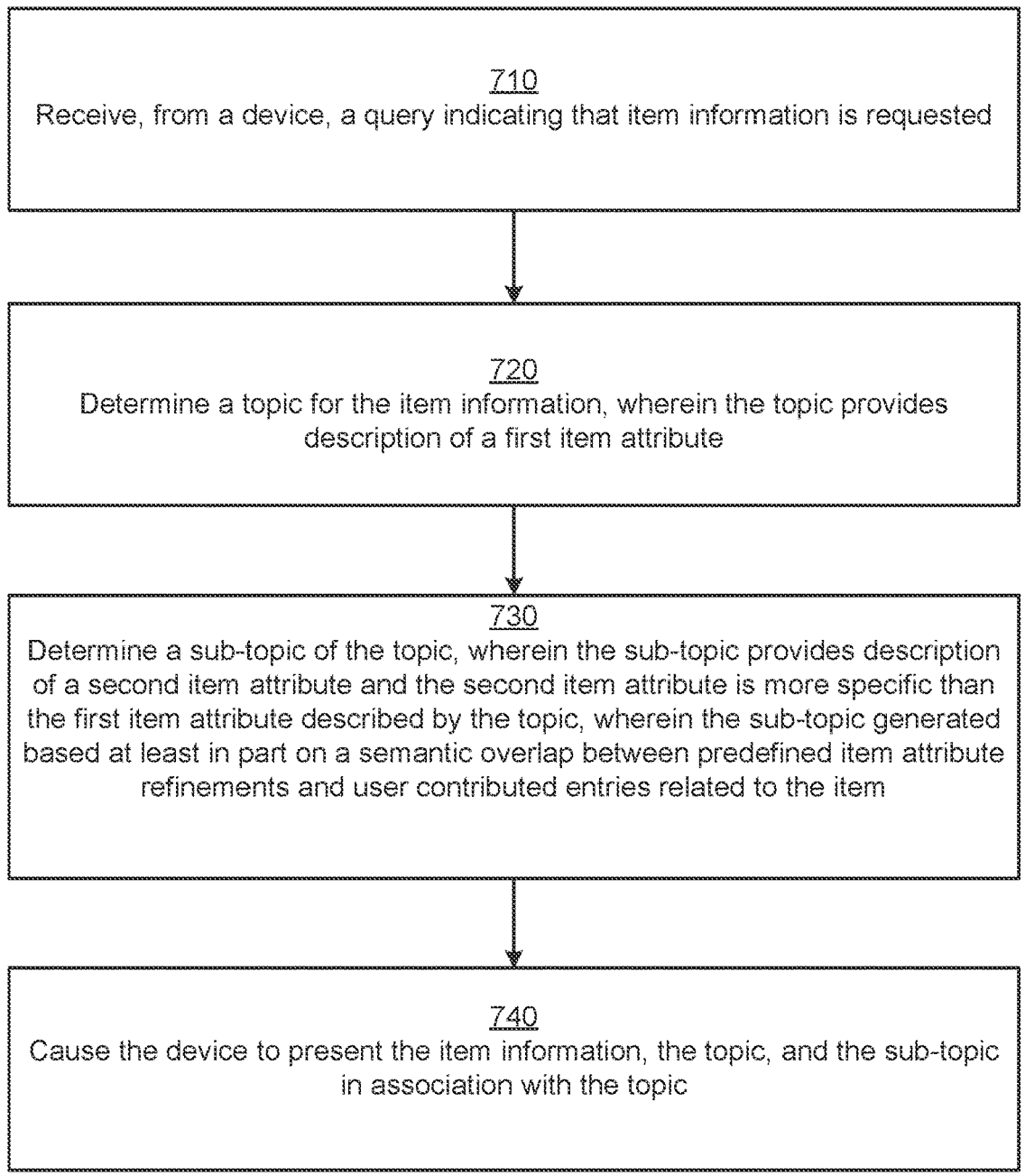
FIG. 7 illustrates an example flow of a process 700 for presenting various information of an item based on a query, according to at least one example.

FIG. 7 illustrates an example flow of a process 700 for presenting various information of an item based on a query, according to at least one example. The various information being present may include item information, the topic, the sub-topic in association with the topic, and/or the item identifier in association with the sub-topic.

In an example, the flow includes operation 710, where the computer system 140 receives, from a device, a query indicating that item information is requested.

In an example, the flow includes operation 720, where the computer system 140 determines a topic for the item information, wherein the topic provides description of a first item attribute. In some examples, the topic may describe a broad attribute that is applicable across contexts (i.e., "Highly Rated," "Best Seller," etc.). In some examples, the topic for the item information may refer to a broad category of an item (e.g., appliances, pet supplies, etc.).

In an example, the flow includes operation 730, where the computer system 140 determines a sub-topic of the topic, wherein the sub-topic provides description of a second item attribute and the second item attribute is more specific than the first item attribute described by the topic, wherein the sub-topic generated based at least in part on a semantic overlap between predefined item attribute refinements and user contributed entries related to the item. In some examples, the computer system 140 may use machine learning models to generate the sub-topic.

In an example, the flow includes operation 740, where the computer system 140 causes the device to present the item information, the topic, and the sub-topic in association with the topic.

Figure 8:
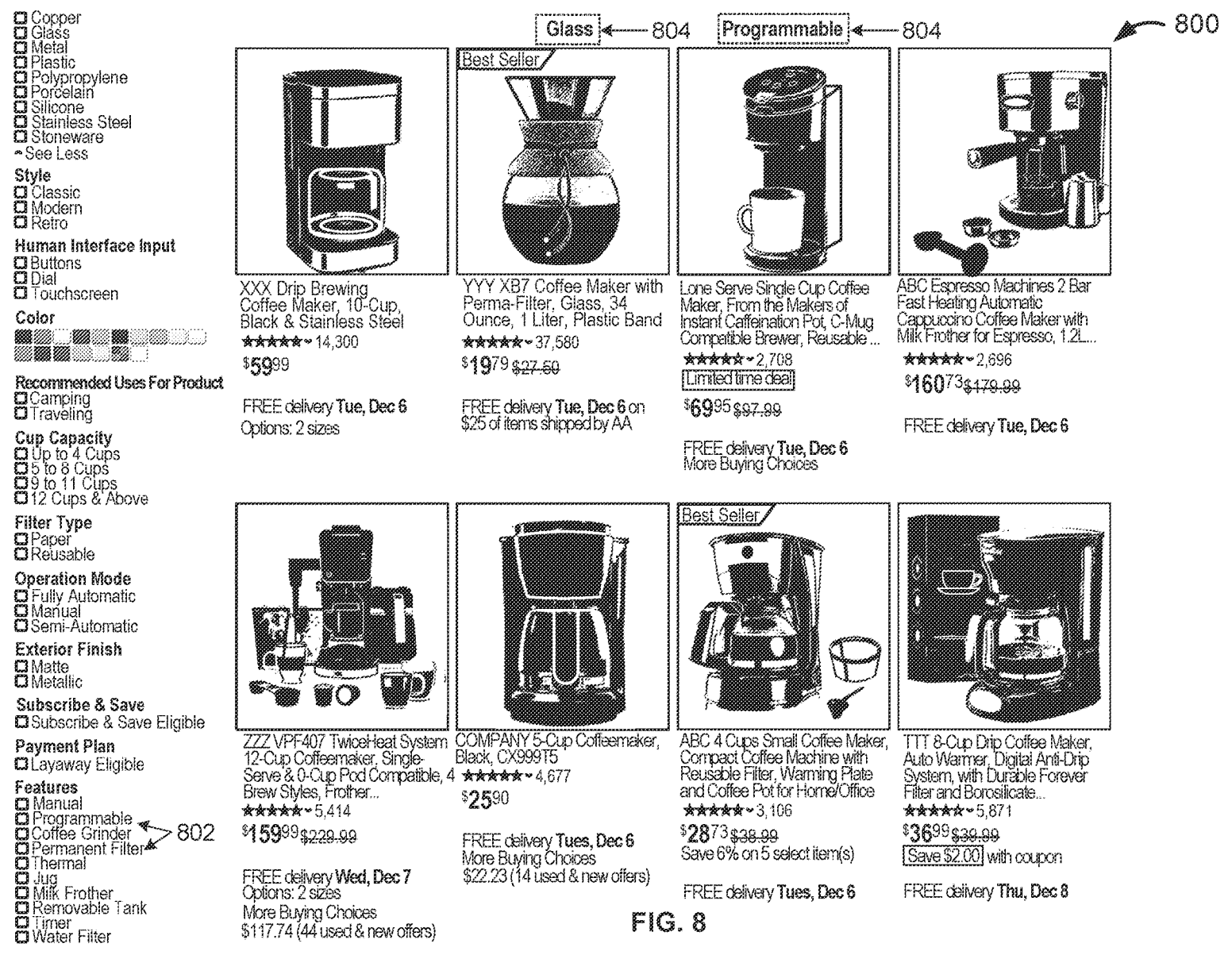

FIG. 8 illustrates an example user interface 800 for providing description to a user, according to at least one example. In user interface 800, an e-commerce context is illustrated in which a user 110 of FIG. 1 may shop for one or more items. As illustrated in FIG. 8, for a search query including keyword "coffee maker," the shopping website includes a plurality of refinements 802 that are directed to the attributes related to items that may be related to the keyword "coffee maker." Although not shown in the current example, the user interface 800 may include a macro-thematic refinement "Best Seller" refers to a broad item attribute (i.e., this item has recently sold more than any other product in that category) that is applicable across contexts and satisfying a general shopping intent. Another exemplary macro-thematic refinement is "Highly Rated" (not shown in FIG. 8) that shows an item has high average rating and high number of ratings. Moreover, the user interface 800 also shows a plurality of micro-thematic refinements 802 that are within the macro-thematic refinement and are directed to more specific item attributes (i.e., "manual", "programmable", "coffee grinder"). Finally, sub-topics/micro-themes 804 generated using the methods described herein are illustrated. Although sub-topics/micro-themes illustrated by user interface 800 are single vocabulary texts like "Glass" and "Programmable," the generated sub-topics/micro-themes may be any combination of natural language or symbols as needed.

Figure 9:
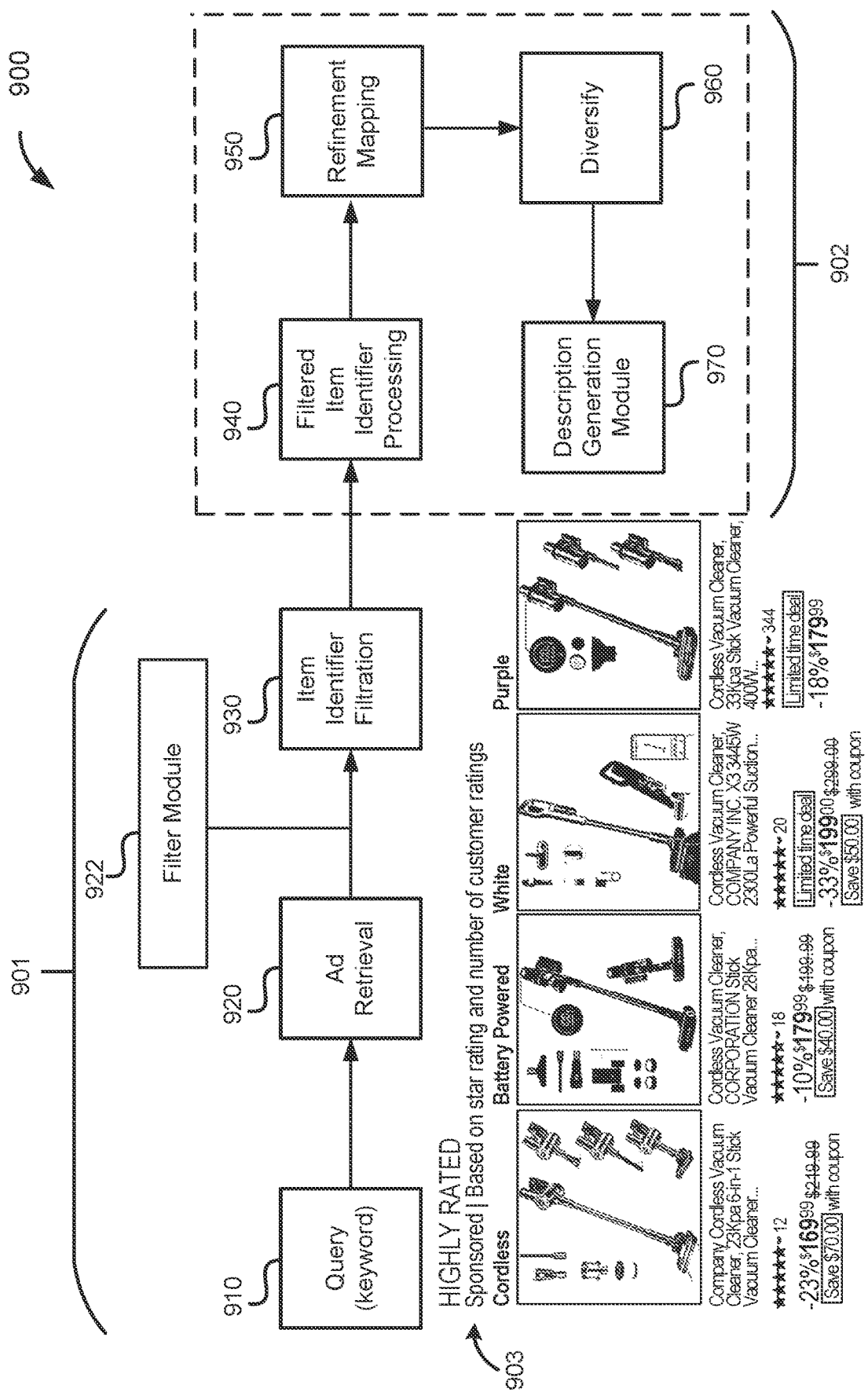
FIG. 9 illustrates an example of a diagram 900 for presenting generated description within an ad auctions framework, according to at least one example.

FIG. 9 illustrates an example of a diagram 900 for presenting generated description within an ad auctions framework, according to at least one example. In some examples, the diagram 900 involves two stages: an ad sourcing 901 stage, whereby the computer system 140 associates query including a keyword to item identifiers that are ad items, and a diversification 902 stage whereby the computer system 140 maps item identifiers to refinements, diversifies item identifiers based at least in part on the mapped refinements, and generates descriptions (i.e., micro-themes/sub-topics) using diversified refinements by using the description generation methods described herein. As illustrated by step 910, the first stage 901 can be triggered by receiving a query including a keyword in a device 120 in FIG. 1. The keyword in the query is used to determine a first set of item identifiers for ad items at step 920. At step 930, the first set of item identifiers may be filtered by using a filter module 922 based on predetermined standards or metrics to form a second set of filtered item identifier. In some examples, the filter module 922 may include a lookup table. In one non-limiting example, at step 930, the computer system 140 may only keep item identifiers that have a minimum rating of 10 and remove item identifiers that fail to meet the minimum rating threshold.

The diversification 902 stage starts with step 940. At step 940, the computer system 140 can process the second set of filtered item identifiers as needed to form a third set of processed item identifiers. In some examples, the second set of filtered item identifiers may be ranked based on their predetermined auction scores or any similar metrics. At step 950, each item identifier is mapped with a set of associated refinements. In some examples, the set of associated refinements may be the same set of generated refinements determined by the methods described in FIG. 1, 2, 4, 5, 6, or 7. At step 960, the computer system 140 applies any diversification actions as needed to form a fourth set of diversified item identifiers. In some examples, when the computer system 140 determines that a first item identifier in the third set and a second item identifier in the third set have sets of associated refinements that are duplicate, the computer system 140 may remove the item identifier having a lower auction score. At step 970, the computer system 140 retrieves the set of associated refinements for an item identifier in the fourth set, and generates and presents descriptions to a web page at least in part based on the set of associated refinements. Exemplary GUI 903 provides an example user interface for providing generated description within an ad auctions framework. As GUI 903 illustrates, web page 126 presents items with generated descriptions for a query including keyword "vacuum," and the items are displayed under a macro-theme/topic of "Highly Rated" in a sequence based at least in part of their auction scores together with diversified micro-themes/sub-topics (i.e., "Cordless," "Battery Powered," "White," "Purple.").

Figure 10:
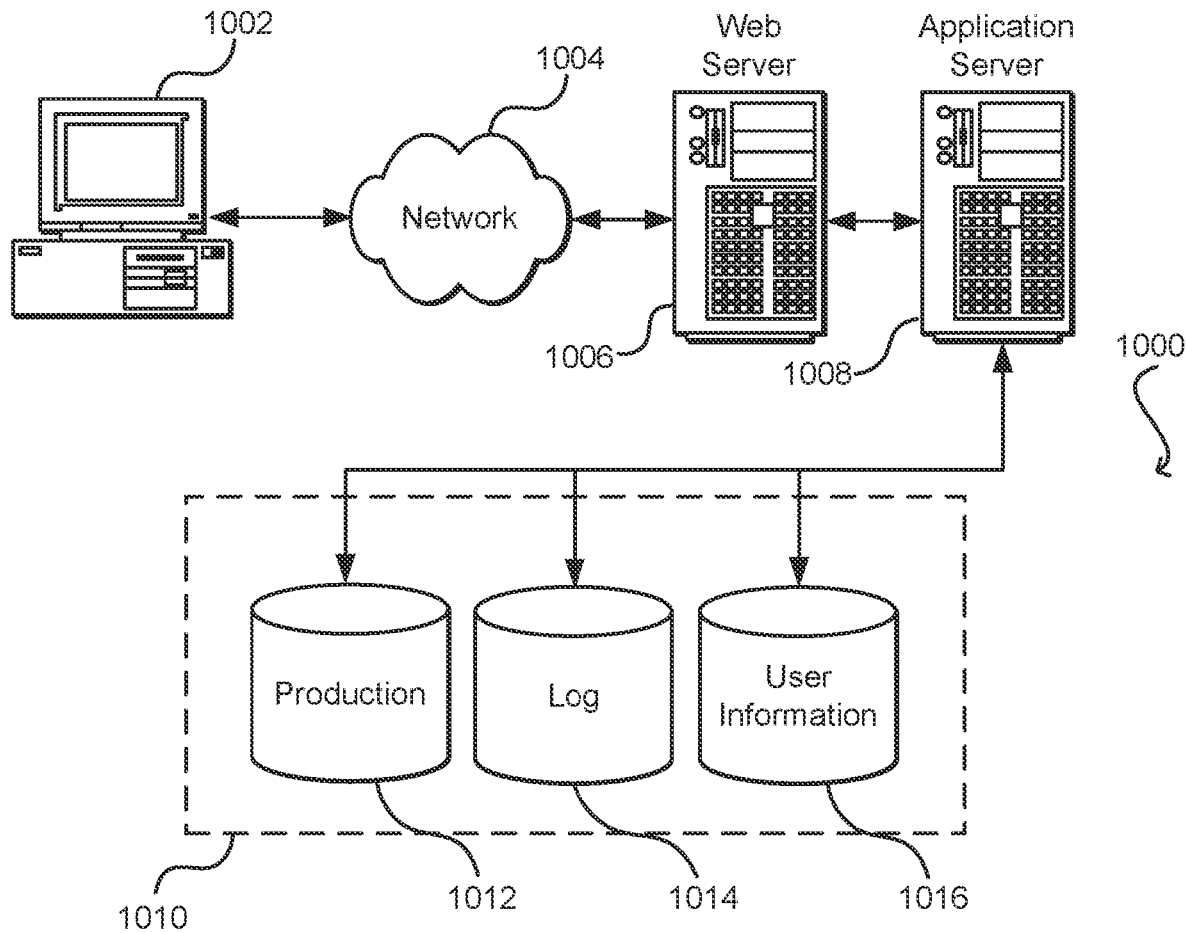
FIG. 10 illustrates aspects of an example environment 1000 for implementing aspects, according to at least one example.

FIG. 10 illustrates aspects of an example environment 1000 for implementing aspects, according to at least one example. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

In some examples, cell phones (or, more broadly, mobile phones) may be one specific type of mobile device that is an example of the electronic client device 1002. In some instances, a user's mobile device may be considered their primary client device. Other example mobile devices include wearables, such as watches, worn sensors (e.g., rings, bracelets, etc.), cameras, eyeglasses, and the like, which may be considered "connected" auxiliary devices. In some examples, the combination of a user's primary mobile device and all or some of their connected, auxiliary devices, may make up a single mobile system configured to communicate with the Web server 1006 or other servers over the network 1004 or other networks.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:
   receiving, from a device, a query indicating that item information is requested;
   determining a topic for the item information, wherein the topic provides description of a first item attribute of an item;
   determining a sub-topic of the topic, wherein the sub-topic provides description of a second item attribute that is more specific than the first item attribute, wherein the sub-topic is generated based at least in part on a semantic overlap between predefined item attribute refinements and user contributed entries related to the item, wherein the semantic overlap is determined by at least:
      generating a first embedding based at least in part on the predefined item attribute refinements;
      generating a second embedding based at least in part on the user contributed entries related to the item; and
      inputting the first embedding and the second embedding into a machine learning model that is trained to output semantic overlap existence by determining a similarity between the first embedding and the second embedding; and
   causing the device to present the item information, the topic, and the sub-topic in association with the topic.

2. The computer-implemented method of claim 1, generating the sub-topic based at least in part on the semantic overlap, wherein the user contributed entries comprise questions or answers from a Q&A section.

3. The computer-implemented method of claim 1, causing the device to present the item information, the topic, and the sub-topic in association with the topic, further comprising:
   receiving, from a device, a second query indicating that item information is requested;
   associating a browse node with the second query;
   extracting at least one child node of the browse node; and
   causing the device to alternatively present the at least one child node instead of the sub-topic generated based at least in part on the semantic overlap if a classifier determines that a probability of copying the at least one child node is higher than a predetermined threshold.

4. The computer-implemented method of claim 3, causing the device to alternatively present the at least one child node, wherein the classifier is a machine learning model that is trained to estimate informativeness of a child node.

5. The computer-implemented method of claim 1, determining a topic for the item information, further comprising:
   determining a keyword included in the query; and
   retrieving a topic associated with the keyword from a data store.

6. The computer-implemented method of claim 1, determining a sub-topic of the topic, wherein the sub-topic comprises at least one natural language.

7. The computer-implemented method of claim 1, determining a sub-topic of the topic, the sub-topic generated based at least in part on a semantic overlap between predefined item attribute refinements and user contributed entries related to the item, wherein the sub-topic is generated by:
   generating an input to a machine learning model based on the semantic overlap between predefined item attribute refinements and user contributed entries related to the item; and
   determining an output that is in text form.

8. The computer-implemented method of claim 1, before determining a sub-topic of the topic, further comprising determining a relevancy of the predefined item attribute refinements.

9. The computer-implemented method of claim 1, after determining an identifier of an item associated with the sub-topic, further comprising:
   determining a score associated with the identifier; and
   determining a display position in a sequence of the item associated with the identifier based at least in part on the score.

10. The computer-implemented method of claim 1, determining a sub-topic of the topic, the sub-topic generated based at least in part on a semantic overlap between predefined item attribute refinements and user contributed entries related to the item.

11. One or more non-transitory computer-readable storage media storing instructions that, upon execution on a system, cause the system to perform operations comprising:
   receiving, from a device, a query indicating that item information is requested;
   determining a topic for the item information, wherein the topic provides description of a first item attribute of an item;
   determining an identifier of an item associated with the query;
   determining a sub-topic of the topic, wherein the sub-topic provides description of a second item attribute that is more specific than the first item attribute, wherein the sub-topic is generated based at least in part on a semantic overlap between predefined item attribute refinements and user contributed entries related to the item, wherein the semantic overlap is determined by at least:
      generating a first embedding based at least in part on the predefined item attribute refinements;
      generating a second embedding based at least in part on the user contributed entries related to the item; and
      inputting the first embedding and the second embedding into a machine learning model that is trained to output semantic overlap existence by determining a similarity between the first embedding and the second embedding; and
   causing the device to present the item information, the topic, the sub-topic in association with the topic, and the identifier in association with the sub-topic.

12. The one or more non-transitory computer-readable storage media of claim 11 storing further instructions that, upon execution on the system, cause the system to perform additional operations comprising:
   removing at least one predefined item attribute refinement based at least in part on a relevancy of the at least one predefined item attribute refinement when determining a sub-topic of the topic.

13. The one or more non-transitory computer-readable storage media of claim 12, wherein the relevancy of the at least one predefined item attribute refinement is determined by a classifier that is fine-tuned on annotated data in a form of binary relevance labels for a query and refinement pair.

14. The one or more non-transitory computer-readable storage media of claim 11, wherein the query, the identifier, and the predefined item attribute refinements are a first query, a first identifier, and a first set of predefined item attribute refinements, respectively, wherein one or more non-transitory computer-readable storage media store further instructions that, upon execution on the system, cause the system to perform additional operations comprising:
   receiving, from a device, a second query indicating that item information is requested;
   determining a second topic for the item information;
   determining a second identifier of a second item associated with the second query;
   retrieving a first score associated with the first identifier;
   retrieving a second score associated with the first identifier;
   forming a rank list of the first identifier and the second identifier based at least in part on their scores;
   mapping a first set of predefined item attribute refinements to the first identifier in the rank list;
   mapping a second set of predefined item attribute refinements to the second identifier in the rank list;
   determining whether the first set of predefined item attribute refinements and the second set of predefined item attribute refinements are duplicate; and
   removing the first set of predefined item attribute refinements if the first set of predefined item attribute refinements and the second set of predefined item attribute refinements are determined to duplicate and the first identifier has a lower score.

15. A system comprising:
   one or more processors; and
   one or more memory storing instructions that, upon execution by the one or more processors, configure the system to:
      receive, from a device, a query indicating that item information is requested;
      determine a topic for the item information, wherein the topic provides description of a first item attribute;
      determine a sub-topic of the topic, wherein the sub-topic provides description of a second item attribute that is more specific than the first item attribute, wherein the sub-topic is generated based at least in part on a semantic overlap between predefined item attribute refinements and user contributed entries related to the item wherein the semantic overlap is determined by at least:
         generating a first embedding based at least in part on the predefined item attribute refinements;
         generating a second embedding based at least in part on the user contributed entries related to the item; and
         inputting the first embedding and the second embedding into a machine learning model that is trained to output semantic overlap existence by determining a similarity between the first embedding and the second embedding; and
      cause the device to present the item information, the topic, and the sub-topic in association with the topic.

16. The system of claim 15, wherein the one or more memory store further instructions that, upon execution by the one or more processors, configure the system to:
   store association data that associates a keyword and a browse node of a web site;
   receive, from a device, a second query including the keyword;
   extract at least one child node of the browse node; and
   cause the device to present second item information that includes the at least one child node instead of the sub-topic if a classifier determines that a probability of copying the at least one child node is higher than a predetermined threshold.

17. The system of claim 15, wherein generating the sub-topic comprises:
   generating an input to a machine learning model based on the topic; and
   determining an output that is in text form.

* * * * *